No. 648,990. Patented May 8, 1900.
W. H. ODELL.
FEED WATER CIRCULATOR AND PURIFIER.
(Application filed Nov. 28, 1898.)
(No Model.) 2 Sheets—Sheet 1.
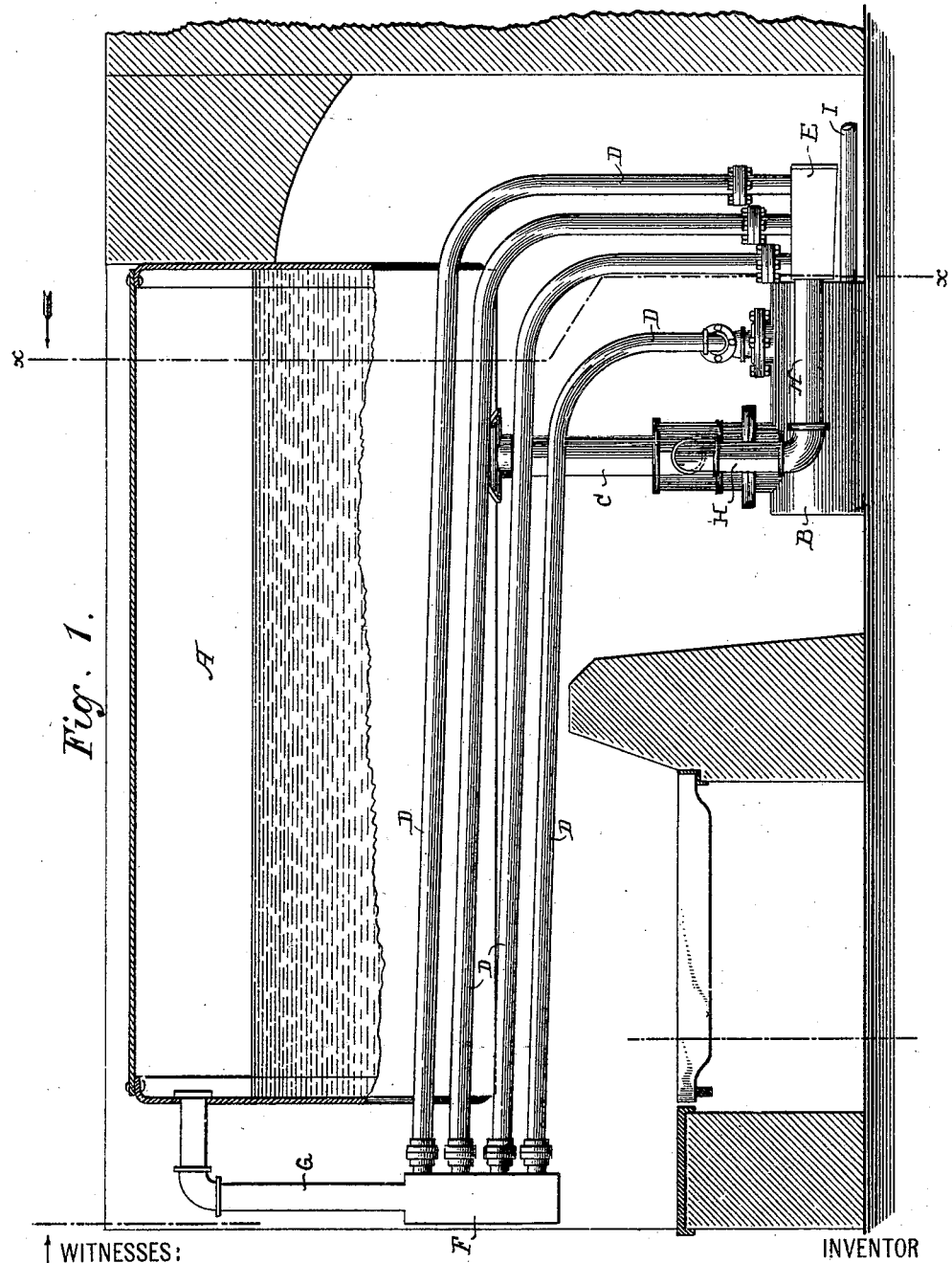
WITNESSES:
Harlow H. Loomis
Peter F. W. Reuther
INVENTOR
William H. Odell
BY
Waldo G. Morse
ATTORNEY No. 648,990. Patented May 8, 1900.
W. H. ODELL.
FEED WATER CIRCULATOR AND PURIFIER.
(Application filed Nov. 28, 1898.)
(No Model.) 2 Sheets—Sheet 2.
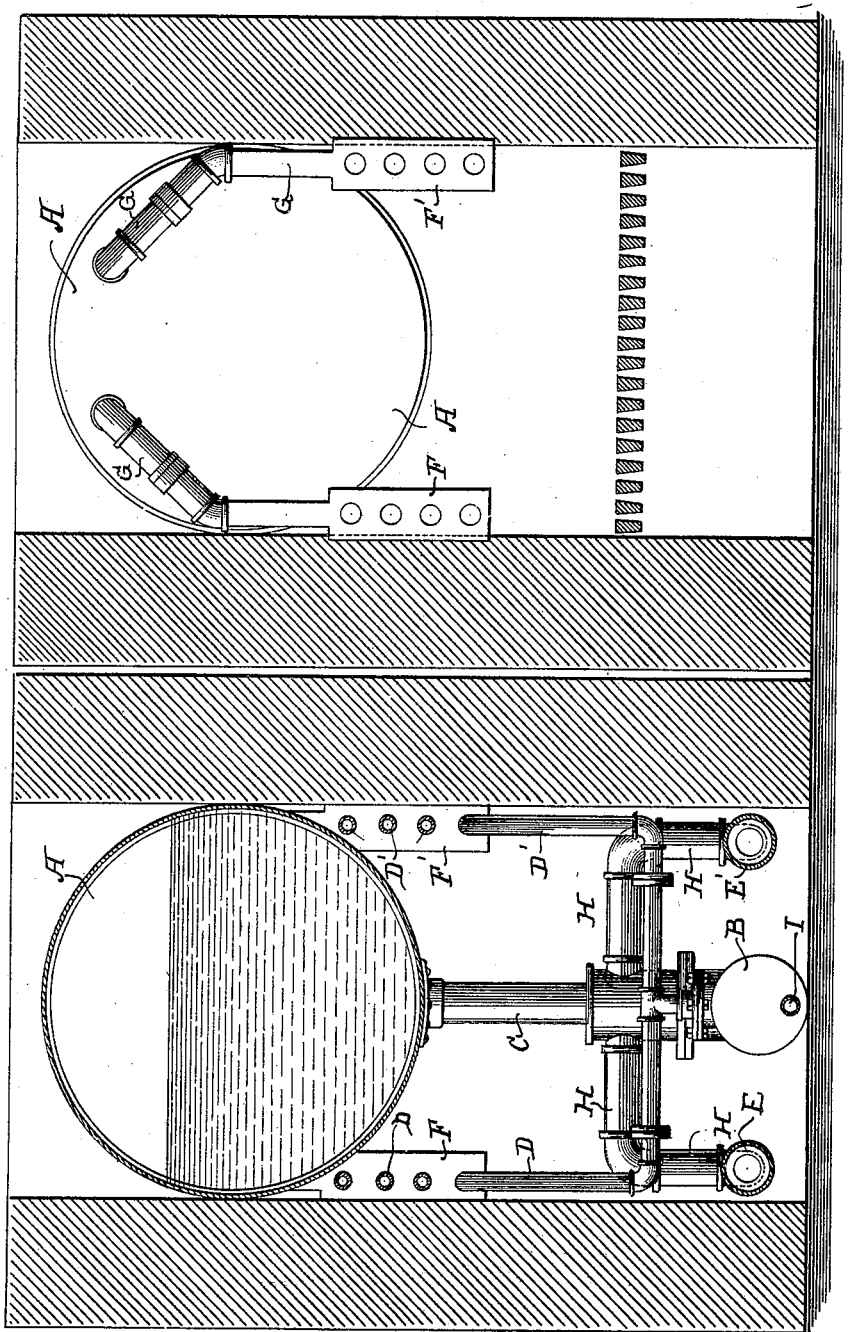
WITNESSES:
Harlow H. Loomis
Peter F. H. Reuther
INVENTOR
William H. Odell
BY
Waldo G. Morse
ATTORNEY

United States Patent Office.

WILLIAM H. ODELL, OF YONKERS, NEW YORK.

FEED-WATER CIRCULATOR AND PURIFIER.

SPECIFICATION forming part of Letters Patent No. 648,990, dated May 8, 1900.

Application filed November 28, 1898. Serial No. 697,609. (No model.)

*To all whom it may concern:*

Be it known that I, WILLIAM H. ODELL, a citizen of the United States of America, and a resident of the city of Yonkers, in the county of Westchester and State of New York, have invented certain new and useful Improvements in Water Circulators and Purifiers in Steam-Generators, of which the following is a specification, reference being had to the accompanying drawings, which form a part hereof.

My improved art or method has reference to the removal from the water, in a steam-generating boiler, of scales, mud, and other substances contained therein and the rendering of such water free from impurities, with an accompanying increase in the steam-producing capacity of such boiler, the utilization of heat usually lost, and an added efficiency in the boiler itself by reason of its freedom from sediment and scale, together with an increase of the total capacity of the entire plant.

My improved apparatus relates to means for operating and regulating my improved method in the most effective manner; and its object is to provide for this purpose a simple means which may be applied to or embodied in existing steam-generating apparatus without material changes therein and which when so applied or embodied may, together with said apparatus, be operated in accordance with my improved method.

The new art or method consists in causing a continuous current of water to pass through a mud-drum or settling-chamber connected at one end with the shell of a steam-generating boiler at or near its bottom and at the opposite end to one or more circulating-pipes, fewer than the whole number leading from one end of the boiler to the other end thereof, and so inducing a continuous gentle flow of water through the said mud-drum or settling-chamber, depositing therefrom impurities and sediment, and relieving the boiler-pipes and feed-water from sediment and impurities contained, which are caused to mass in the mud-drum or settling-chamber, the purified water continuing in circulation through the pipes and boiler.

It also consists in so arranging such apparatus that the flow to said mud-drum or settling-chamber tends downward through a pipe directly below the opening in the shell of the boiler, such pipe being preferably of greater diameter than the one through which the water leaves the boiler and the flow through the other pipes not connected with said mud-drum being taken therefrom horizontally below the point at which the smaller enters the larger pipe and above the lower end of the smaller projecting downward into the larger in such manner that the current of water will move slowly, allowing heavy substances therein to readily pass downward into such mud-drum or settling-chamber.

It also consists in controlling by adding to or taking from the number of pipes connected to the opposite end of the boiler from that at which the water enters the mud-drum or settling-chamber and transferring them to or removing them from the mud-drum or settling-chamber, as the case may be, thus regulating the flow of water through the mud-drum or settling-chamber.

It also consists in other steps and features hereinafter described and claimed.

The new apparatus consists of means for causing water from the boiler to flow through the mud-drum or settling-chamber through one or more circulating-pipes, fewer than the whole number leading from one end of such boiler to the other, thus inducing a continuous gentle flow of water through the said mud-drum or settling-chamber.

It also consists of means for controlling said flow of water through the mud-drum or settling-chamber by adding to or taking from the number of pipes connected with the opposite end of the boiler from that from which the water enters the mud-drum or settling-chamber.

It also consists in the various other devices and combinations hereinafter described and claimed.

The invention is based upon the fact which I have discovered that a current of water passing through such mud-drum or settling-chamber may be so regulated that solid particles held in suspension will be deposited in such drum or chamber, and that by increasing or diminishing the rapidity of such flow, as indicated, a proper rate may be obtained, and the water circulating through such drum or chamber and through such other pipes continually will eventually deposit in the drum or chamber solid matter contained, thereby preventing an accumulation of the same in the other pipes and in the boiler and increasing the efficiency of the entire apparatus as a generator of steam. It is apparent that a rapid flow of water through such drum or chamber, such as that occasioned when all such pipes lead from the same, would prevent the operation of the method herein described.

In carrying out my improved method in the best way known to me the series of pipes, some passing from such drum or chamber and some passing around the same, are placed upon the sides of the furnace-chamber or fire-box, longitudinally along the greatest length thereof, parallel to the bottom of the boiler beneath which they are fitted. Under these conditions the heat which would otherwise be lost in the sides of the fire-box is utilized for the production of steam, the burning out of the walls of the fire-box is prevented, and a circulation of water is established from the bottom of the boiler through such pipes and a portion slowly through such mud-drum or settling-chamber, depositing foreign matter and clearing the water, which is returned continuously to the top of the boiler at the other end from that from which it is taken. Thus sediment will be gradually deposited and accumulated in such mud-drum, and the efficiency of the boiler, as well as of the entire water-heating apparatus, greatly increased.

It is well known that boilers which are kept free from scales and sedimentary deposits are the most serviceable, and it is also well known that water-pipes under boilers arranged in the common way for the purpose of securing additional heating surface become rapidly clogged with sediment, ineffectual, and dangerous.

In the best form of my invention the supply of water through the mud-drum or settling-chamber is regulated by the number of pipes taking water therefrom as compared with the total number of pipes under such boiler.

In the practice of my improved method and apparatus the boiler is filled with water and the fire started in the usual way, no special manipulation being necessary save that the mud-drum or settling-chamber should occasionally be blown out or cleaned.

Having thus fully described my improved method, I shall now describe my improved means to carry the same into effect.

Referring to the drawings, Figure 1 is a transverse section. Fig. 2 is a front cross-section. Fig. 3 is a rear cross-section.

A is a plain tubular boiler.

B is a mud-drum or settling-chamber connected to the bottom of the shell of the boiler A by the pipe C.

D D' are a series of bent circulating-pipes arranged along the side walls of the boiler-setting, a number of which pipes are connected at the back end of the headers E E', while at the front end all said circulating-pipes are connected to headers F F', which are in turn connected to the front tube-sheet of the boiler A by suitable pipes G G', through which the heated water and steam generated in the pipes D D' and their connections are delivered to the boiler; but a portion of the water taken from the bottom of the boiler by means of the pipe C is conveyed to the back headers E E', and the remainder of such water is made to enter the mud-drum or settling-chamber at its front end and then pass slowly through to its rear end, where it enters one or more of the circulating-pipes and is then conveyed to the front headers F F', as shown.

About midway between the shell of the boiler A and the mud-drum or settling-chamber B a portion of the water drawn from the boiler is diverted through the medium of the pipes H H' to the headers E E', while the remainder flows on down to the front end of the drum or chamber, as above described.

It will be seen that the amount of water passing through the mud-drum or settling-chamber is controlled by the number of circulating-pipes attached to the opposite end of the mud-drum from that at which the water enters the same, and thus the circulation of water through it is controlled at will. It is further evident that a slowly-flowing current of water passing horizontally through the mud-drum or settling-chamber will permit a greater or less amount of scale and impurities carried along with the water to drop out of the circulation and remain in the mud-drum, which thus becomes a settling-chamber, from which such accumulations may be blown out at intervals through the blow-off pipe I.

The object of arranging the bent pipes D D' along the side walls of the boiler-setting is in part to absorb into the feed-water a portion of the heat which would otherwise be taken up by such side walls without useful result, also to protect the side walls of the fire-box from the destructive heat of the fire, and thus reduce the expense of frequently relining or restoring said side walls and securing economy of maintenance. A further object attained by use of the circulating-pipes is the maintenance of a rapid circulation of water over the entire steam-generating surface of the apparatus, rendering it more efficient in absorbing the heat of combustion.

The object of removing the impurities from the water is to keep the boiler clean, thus prolonging its life, lessening the likelihood of destructive explosions, and at the same time effecting an economy of fuel because of the more rapid transmission of heat across the heating-surface.

What I claim as new, and desire to secure by Letters Patent, is—

1. The combination with a boiler having external thereto and leading from one end thereof to the other a pipe or set of pipes for permitting the circulation of water from and back to the boiler, of a mud-drum and an additional pipe or set of pipes similarly connected to the boiler and constituting a supplementary circulating system of less capacity than the first-mentioned pipe or pipes, whereby a gentle flow of water through said mud-drum is permitted and the impurities are there deposited.

2. The combination with a boiler having external thereto and leading from one end thereof to the other a pipe or set of pipes for permitting the circulation of water from and back to the boiler, of a mud-drum and an additional pipe or set of pipes similarly connected to the boiler and constituting a supplementary circulating system of less capacity than the first-mentioned pipe or pipes, whereby a gentle flow of water continues downward into said mud-drum, or settling-chamber, while the main current, or flow, is turned upward through an annular or similar space and thence returned to the boiler so that such gentle flow proceeds into and through said mud-drum, and the impurities thrown downward, are there deposited.

Signed by me at New York, N. Y., this 27th day of October, 1898.

WILLIAM H. ODELL.

Witnesses:
JAMES B. ODELL,
FRANK J. GOREY.